US007837071B2

(12) United States Patent
Achrainer

(10) Patent No.: US 7,837,071 B2
(45) Date of Patent: Nov. 23, 2010

(54) VALVE DEVICE OF AN APPLICATION DEVICE FOR APPLYING FLUID TO A SUBSTRATE, AND APPLICATOR

(75) Inventor: Johann Achrainer, Schwoich (AT)

(73) Assignee: J. Zimmer Maschinenbau Gesellschaft m.b.H., Kufstein (AT)

( * ) Notice: Subject to any disclaimer, the term of this patent is extended or adjusted under 35 U.S.C. 154(b) by 0 days.

(21) Appl. No.: 12/664,439
(22) PCT Filed: May 20, 2008

(86) PCT No.: PCT/EP2008/004123

§ 371 (c)(1), (2), (4) Date: Dec. 14, 2009

(87) PCT Pub. No.: WO2008/151714

PCT Pub. Date: Dec. 18, 2008

(65) Prior Publication Data

US 2010/0170918 A1 Jul. 8, 2010

(30) Foreign Application Priority Data

Jun. 14, 2007 (EP) .................................. 07090124

(51) Int. Cl.
*F16K 51/00* (2006.01)
*B05B 9/00* (2006.01)

(52) U.S. Cl. .................. 222/504; 222/518; 251/129.18; 251/129.21

(58) Field of Classification Search ................. 222/504, 222/518; 251/129.15, 129.18, 129.21
See application file for complete search history.

(56) References Cited

U.S. PATENT DOCUMENTS 3,811,601 A 5/1974 Reighard et al.

(Continued)

FOREIGN PATENT DOCUMENTS

| | | | |
|---|---|---|---|
| DE | 43 02 686 | A1 | 8/1993 |
| DE | 199 10 261 | A1 | 9/2000 |
| DE | 20 2005 011119 | U | 9/2005 |

OTHER PUBLICATIONS

European Patent Office Automated English Translation of DE 19910261.*

(Continued)

*Primary Examiner*—Kenneth Bomberg
(74) *Attorney, Agent, or Firm*—Venable LLP; Robert Kinberg; Steven J. Schwarz

(57) ABSTRACT

A valve device of an application device for applying fluid to a substrate comprises a valve body, a valve housing with inner chamber and valve seat, a supply fluid chamber, an electromagnetic valve actuating device with valve piston and an adjusting piston. The valve nozzle is detachably mounted on the nozzle side of the valve device. The valve device has a nozzle plate which closes the valve body at the bottom on the nozzle side, with mounting opening for the valve piston. The valve housing is designed in the form of a nozzle orifice which is a closure member that can be fitted on the mounting opening from below and removed. The valve nozzle forms part of the valve housing. The valve piston is exposed through the mounting opening of the nozzle plate for removal and fitting when the closure member is removed. The valve device is provided with at least one rectilinear fluid duct that connects the supply fluid chamber to the valve seat. The valve piston and part of the adjusting piston together form a wall of the straight fluid duct which, when the nozzle orifice closure member is removed, is exposed for cleaning through the mounting opening. An application device comprises the valve devices arranged in a row.

13 Claims, 5 Drawing Sheets

U.S. PATENT DOCUMENTS

| | | | | |
|---|---|---|---|---|
| 3,827,604 | A * | 8/1974 | Hamilton et al. | 222/504 |
| 4,488,665 | A * | 12/1984 | Cocks et al. | 222/504 |
| 4,962,871 | A * | 10/1990 | Reeves | 222/504 |
| 5,027,976 | A * | 7/1991 | Scholl et al. | 222/146.5 |
| 5,085,402 | A | 2/1992 | O'Dell | |
| 5,535,919 | A * | 7/1996 | Ganzer et al. | 222/504 |
| 5,598,974 | A * | 2/1997 | Lewis et al. | 251/360 |
| 5,875,922 | A * | 3/1999 | Chastine et al. | 222/504 |
| 5,915,591 | A * | 6/1999 | Erickson et al. | 222/504 |
| 6,419,126 | B2 * | 7/2002 | Righolt | 222/504 |
| 6,994,234 | B2 * | 2/2006 | de Leeuw | 222/504 |
| 2005/0056713 | A1 | 3/2005 | Tisone et al. | |

OTHER PUBLICATIONS

International Search Report and Written Action from PCT/EP2008/004123 dated Sep. 25, 2009 w/ English translation.

* cited by examiner

VALVE DEVICE OF AN APPLICATION DEVICE FOR APPLYING FLUID TO A SUBSTRATE, AND APPLICATOR

This application is a 35 U.S.C. §371 filing of International Patent Application No. PCT/EP2008/004123 filed May 20, 2008, designating the United States and claiming the benefit of European Application No. 07090124.4 filed Jun. 14, 2007.

BACKGROUND OF THE INVENTION

The invention concerns a valve device of an application device for applying fluid to a substrate, comprising a valve body, a valve housing with associated valve nozzle for emission of the fluid under pressure, having an inner chamber which can admit fluid and a valve seat arranged there, a supply fluid chamber which can be subjected to fluid pressure, a fluid connection between supply fluid chamber and valve housing inner chamber, a valve actuating device which is formed by an electromagnetic device with valve piston movable back and forth against a return force and engaging in the valve seat for opening and closing the valve nozzle, and a piston stop which forms an adjusting piston and against which the valve piston operates and which is mounted so as to be displaceable in the direction of the stroke for setting and adjusting the piston stroke, the valve actuating device being arranged between the supply fluid chamber and the valve housing, and the valve nozzle being detachably mounted on the nozzle side of the valve device which comprises it.

The invention also relates to an application device for applying fluid to a substrate, comprising valve devices which are arranged in a row and are each equipped with an application valve nozzle for emitting the fluid under pressure and with associated valve actuating device for controlling the emission of fluid by opening and closing the application valve nozzles, and comprising a common distributing fluid chamber which can be subjected to pressure from the fluid and which connects the application valve devices to each other for admission of the fluid, the distributing fluid chamber being provided with a fluid intake duct which is arranged in such a way that the fluid which is under pressure in the distributing fluid chamber is distributed along the row of application valve devices to the latter.

An application device which is equipped with electromagnetically operated valves is concerned. The valves are opened and closed by individual activation in order to produce an application in dots or dashes, which can result in a two-dimensional application, on a substrate, e.g. a flat strip of material or a surface portion. Any liquid substance is suitable as the application fluid, in particular dye or ink for a colour application. Also, coating or impregnation with adhesives, coating agents or the like can be carried out. Activation determines applied quantities, areas of application, patterns and/or applied symbols.

Cleaning and maintenance of the application device are particularly important. The valve nozzles have a diameter of e.g. only 60 to 150 micrometres. The valve nozzles and fluid paths in the valve devices can easily be blocked by very fine particles or minute deposits. Ordinary valve devices or application devices have to be largely dismantled in order to clean the valve device or several valve devices.

For example, from DE 43 02 686 A1 is known a generic valve device. There, on the lower side of the valve device is provided an interchangeable nozzle which is screwed to a valve housing equipped with valve seat. The valve housing is also screwed into a shell body of an electromagnetic device. For maintenance/cleaning operations, adjusting piston and valve piston must be dismounted in an upward direction. By unscrewing an adjusting screw, the whole piston is taken out. The adjustment setting is lost. The valve housing with valve seat can be unscrewed only after a valve body has been removed from the shell body. The valve device known in DE 43 02 686 A1 has a piston which is constructed as a slotted sleeve with flow channels. Corners of the slotted channels tend to collect dirt. US2005/056713 A1 discloses with FIG. 27 a valve device with annular fluid path between the piston and wall of a piston chamber. There is no provision for special measures for cleaning and maintenance.

Contamination occurs in particular after an initial assembly. But breakdowns due to deposits also occur while operation is ongoing. Also, there are special cleaning requirements if the application substance is to be exchanged, that is, for example, a change of colour is to be made. With conventional application devices with adjusting device (cf. DE 43 02 686 A1), an adjusting piston is dismounted, or relatively elaborate dismounting is performed. After subsequent assembly, adjustment with considerable effort using separate micrometric measuring devices is necessary. Here, the invention is to provide a remedy.

SUMMARY OF THE INVENTION

The invention is therefore based on the aims of improving and simplifying the cleaning and maintenance of the application device and its valve devices. In particular, maintenance and cleaning are to be capable of being performed effectively and easily while maintaining adjustment settings of the valve nozzles.

The aims of the invention are achieved in conjunction with the features of the valve device of the kind mentioned hereinbefore, in that the valve device has a nozzle plate which closes the valve body at the bottom on the nozzle side, with mounting opening for the valve piston, that the valve housing is designed in the form of a nozzle orifice which is a closure member that can be fitted on the mounting opening of the nozzle plate from below and removed, the valve nozzle forming part of the valve housing, and the valve piston engaging in the valve seat for opening and closing the valve nozzle when the closure member is fitted, while the valve piston is exposed through the mounting opening of the nozzle plate for removal and fitting when the closure member is removed, that the valve device is provided with at least one rectilinear fluid duct that remains free from flow corners and that, passing the valve actuating device, connects the supply fluid chamber to the valve seat of the valve housing inner chamber, the valve piston and part of the adjusting piston together forming a wall of the straight fluid duct which, when the nozzle orifice closure member is removed, is exposed for cleaning through the mounting opening.

An application device according to the present invention which is particularly preferred in practice, in particular for colour application, comprises eight application valve devices. But also devices with fewer application nozzles, for example with five nozzles, or with more application nozzles, e.g. with fifteen nozzles, prove to be particularly practical. Application units with preferably five to fifteen application valve devices, in particular in combination with a cleaning valve device, are appropriately also designed as a module element which is assembled with identical module elements into an application device with nozzles arranged in rows and columns Such application module elements can be assembled with socket connections and/or screw connections.

The valve device according to the present invention with electromagnetic device and the application device according to the present invention equipped with electromagnetic valves afford, particularly also in conjunction with a cleaning valve device of the application device, advantages for cleaning the valve fluid ducts between the distributing fluid chamber and the application valve nozzles. When the valve housing is removed, not only does the mounting opening expose the valve piston for removal from the valve device, but also the fluid duct comprising the piston wall is exposed. The rectilinear valve fluid duct which remains free from flow corners ensures excellent flushing. Flow shadows which arise in known application devices due to undercuts, dead corners, areas with slow flow speeds or the like, are avoided. Harmful air bubbles are avoided, because particularly effective deaeration is achieved by the straight flow path running on the wall of the adjusting piston and the valve piston. With the application valve device in each case opened individually, the cleaning fluid cleans the path between the distributing fluid chamber and the valve seat or the valve nozzle arranged thereon, without the application device having to be dismantled. An important advantage here also lies in that the adjusting position of the valve piston set with the adjusting piston is maintained.

Each valve device has, on the nozzle side of the application device, the mounting opening in which the valve housing is inserted in a releasable connection as the closure element and which, when the valve housing is removed, exposes the valve piston for removal from the valve device and the straight fluid duct comprising the piston wall.

The valve nozzle forms part of the valve housing. A nozzle orifice is formed which, as such, covers the mounting opening and its edge from below, the valve housing with the nozzle being designed so as to form together a single part for handling. Advantageously, the nozzle forms on the piston side the valve seat. By simply exchanging the valve housing for a valve nozzle with different dimensions, different degrees of fineness and fluid quantities (ink quantities) can be obtained for application. An adjusting device is preferably formed by a screwed connection with fine thread. By screwing in and unscrewing the adjusting piston, the fine distance with respect to the valve piston and hence the desired fine piston stroke can be adjusted precisely. The piston stroke directly affects the throughflow of the valve device, so that precise adjustment is particularly important for achieving uniform application, in particular a uniform printed image. With the nozzle construction according to the invention, adjustment of the stroke can take place during valve operation. Rotary adjustment of the adjusting piston results in a direct change in throughflow through the valve nozzle.

A further advantage lies in that, in particular after the distributing fluid chamber has been cleaned, the fluid duct between the distributing fluid chamber and the associated application nozzle can be cleaned by the fact that the detachably mounted valve housing designed as a nozzle orifice is removed in case of major contamination. The valve housing and the valve piston are easily removed and remounted on the nozzle side of the application device, that is, on the lower side of the device which forms the application side. Such partial dismounting may be necessary if a change of fluid is to be made, e.g. a change of colour. Unlike conventional application devices, valve bodies or wall parts are not dismounted. This is a considerable advantage, as the adjusting devices are very sensitive to damage. The slightest damage or refitting valve bodies or wall parts can already falsify adjustments within a range of a few micrometres. Flushing the distributing fluid chamber also covers the adjusting pistons for cleaning, without dismounting taking place on the upper/rear side of the application device.

The valve device according to the invention even in the single form achieves the result that, along the straight valve duct path between the supply fluid chamber and the valve nozzle, a straight longitudinal flow takes place. The longitudinal construction avoids flow shadows which would otherwise arise due to undercuts, dead corners, areas with slow flow speeds or the like. Hence not only can the single valve device, as already described, be cleaned particularly well by flushing through. Due to the longitudinal flow, the inner region of the electromagnetic device, namely a magnet coil which partly surrounds the adjusting piston and the valve piston, is effectively cooled as well. This has a favourable effect on the life of the valve device. Design and assembly of the valve device are particularly simple.

The single valve device already has the advantages which were mentioned in connection with the valve devices of the application device. In case of particularly major blockage, the valve housing can easily be removed. The mounting opening is so large that the valve piston likewise can easily be taken out. Hence the valve fluid duct or the common piston chamber which receives the valve piston and the adjusting piston opens towards the nozzle side, that is, downwards. By flushing with cleaning fluid under pressure, the valve fluid duct and the piston chamber are flushed through, and any particles of dirt present are flushed out downwards. The adjusting piston and the adjusting device are not dismounted. Adjustment settings can be retained, and they can be made precisely even during operation of the device, that is, during application.

BRIEF DESCRIPTION OF THE DRAWINGS

Subsidiary claims are aimed at the above and other appropriate and advantageous embodiments of the invention. Particularly appropriate and advantageous embodiments or possible designs of the invention are described in more detail with the aid of the following description of the practical examples shown in the schematic drawings. They show:

DETAILED DESCRIPTION OF THE EMBODIMENTS

Figure 1A:
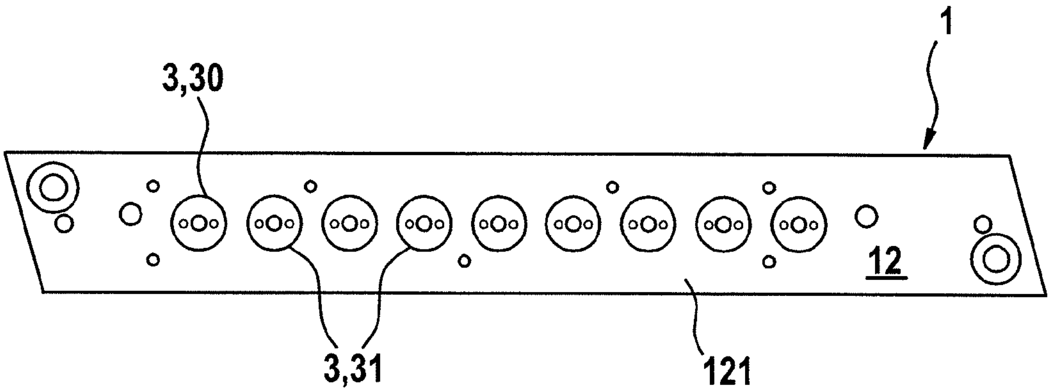
FIGS. 1A to 1D in side views and an axonometric view, an application device according to the invention with eight application valve nozzles according to the invention and one cleaning valve nozzle, FIG. 2 a longitudinal section through an application device according to FIGS. 1A to D, FIG. 3 detail D of FIG. 2, and FIG. 4 a single valve device according to the invention.
Figure 1B:
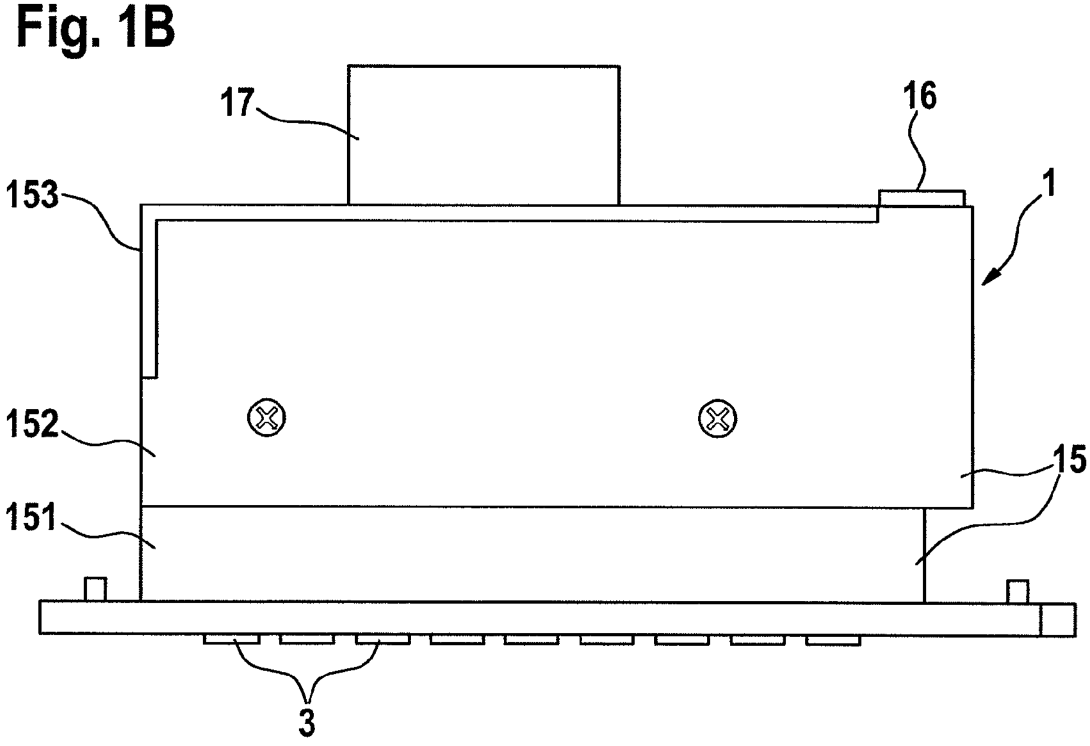
Figure 1C:
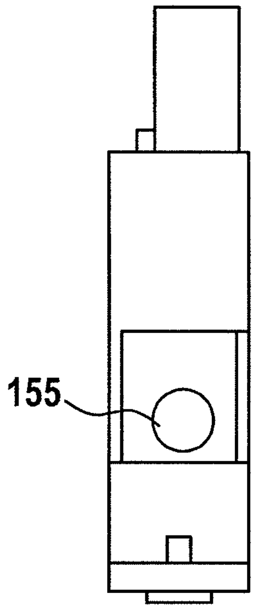
Figure 1D:
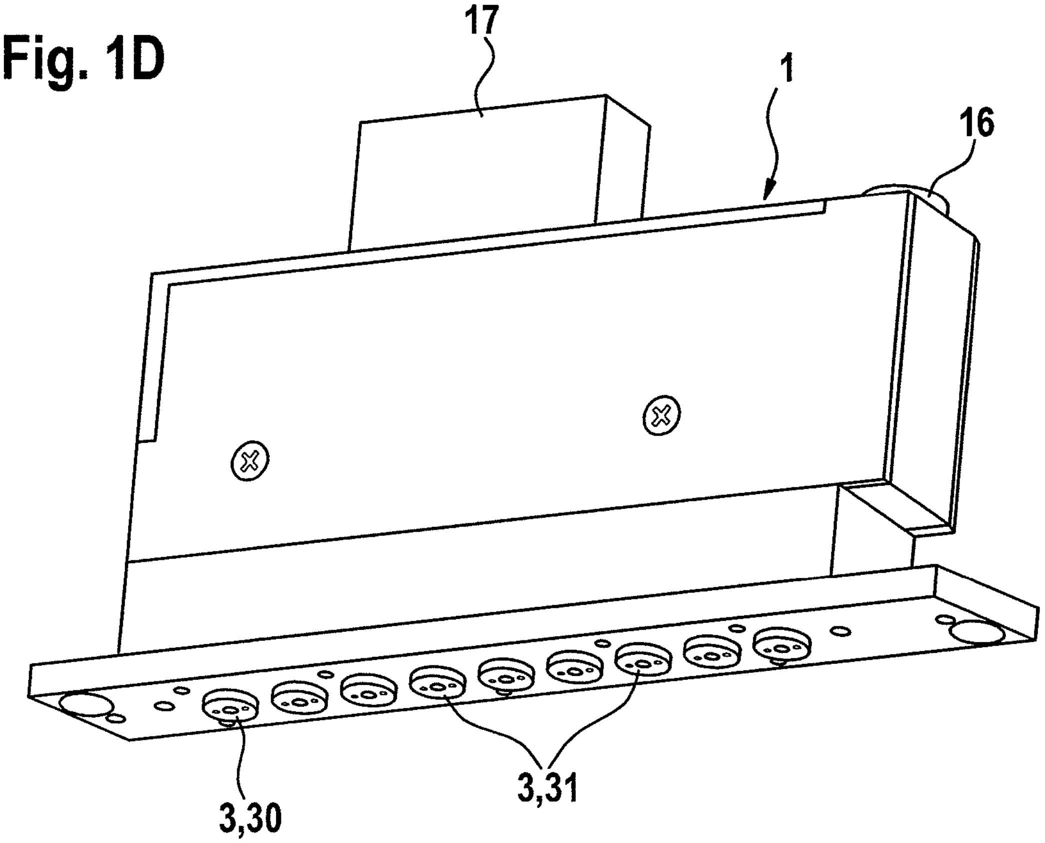

An application device according to the invention shown in FIGS. 1A to D comprises a box-like valve body 15 as a component of valve devices 2. The valve body is composed of a lower socket portion 151 and an upper cover portion 152. The lower portion 151 is closed by a narrow elongate nozzle plate 121 which receives valve nozzles 3 in a particular embodiment according to the invention. The valve nozzles 3 are arranged in a straight row on the nozzle/application side 12. On the opposite side, the application device 1 has an electrical plug-in connection 17 and a connecting opening 16 for application fluid. In the practical example the row of valve nozzles 3 is defined by eight application valve nozzles 31 and one cleaning valve nozzle 30 which closes the row of nozzles. The cleaning valve nozzle 30 is arranged at the end of the row of nozzles opposite the connecting opening 16.

Figure 2:
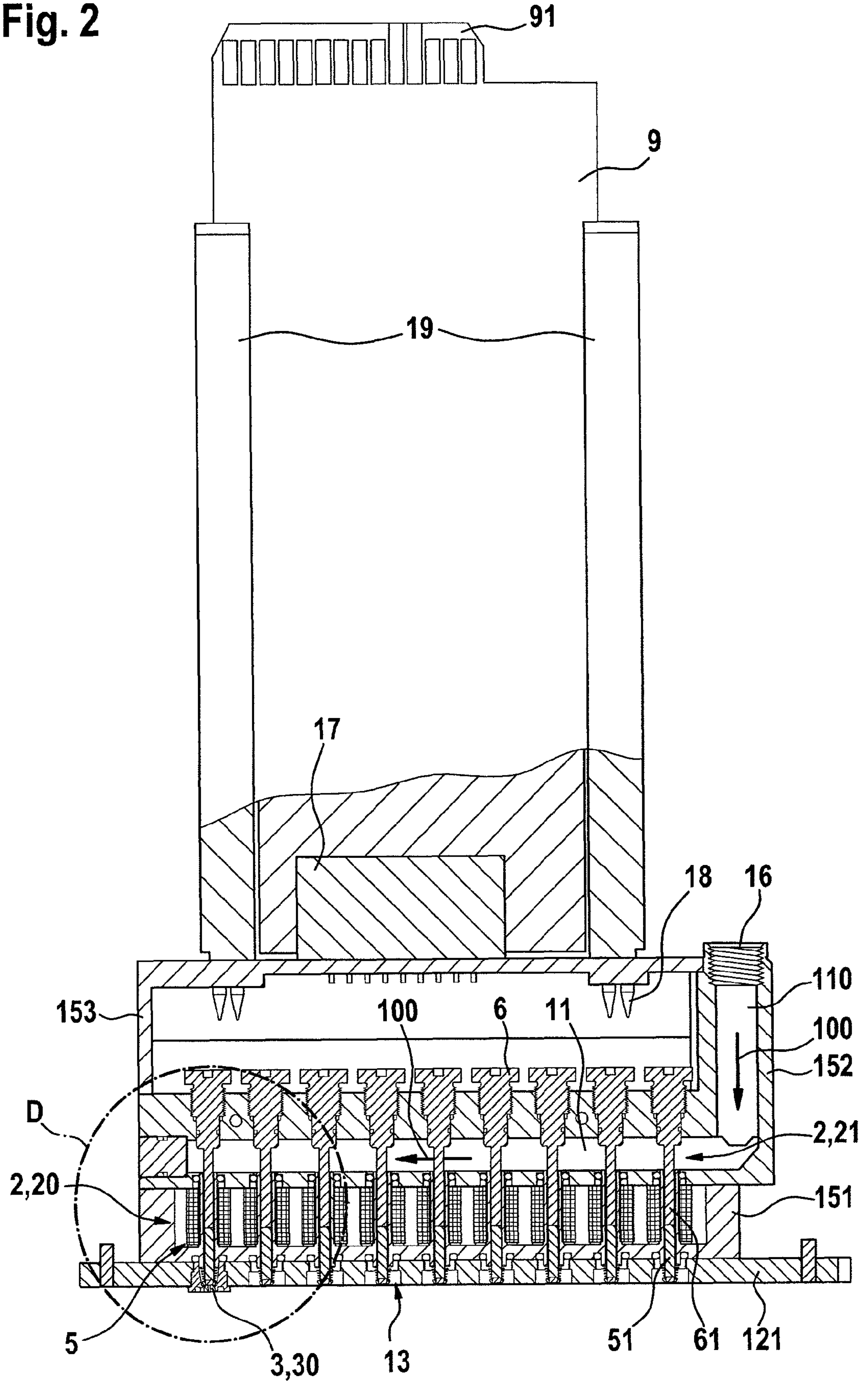

As can be seen from the sectional view in FIG. 2, the valve body 15 is connected to an electronic power switching device 9. This switching device 9 is connected by means of a frame 19 in a plug-in connection 18 to a cap 153 of the upper portion 152. In this connection the switching device 9 is electrically connected to the valve body 15 directly via the plug-in connection 17, without using a flat-strip cable connection. The electrical plug-in connection 17 makes electrical connections, not shown, to electromagnetic valve actuating devices 5 of the application device 1.

Figure 3:
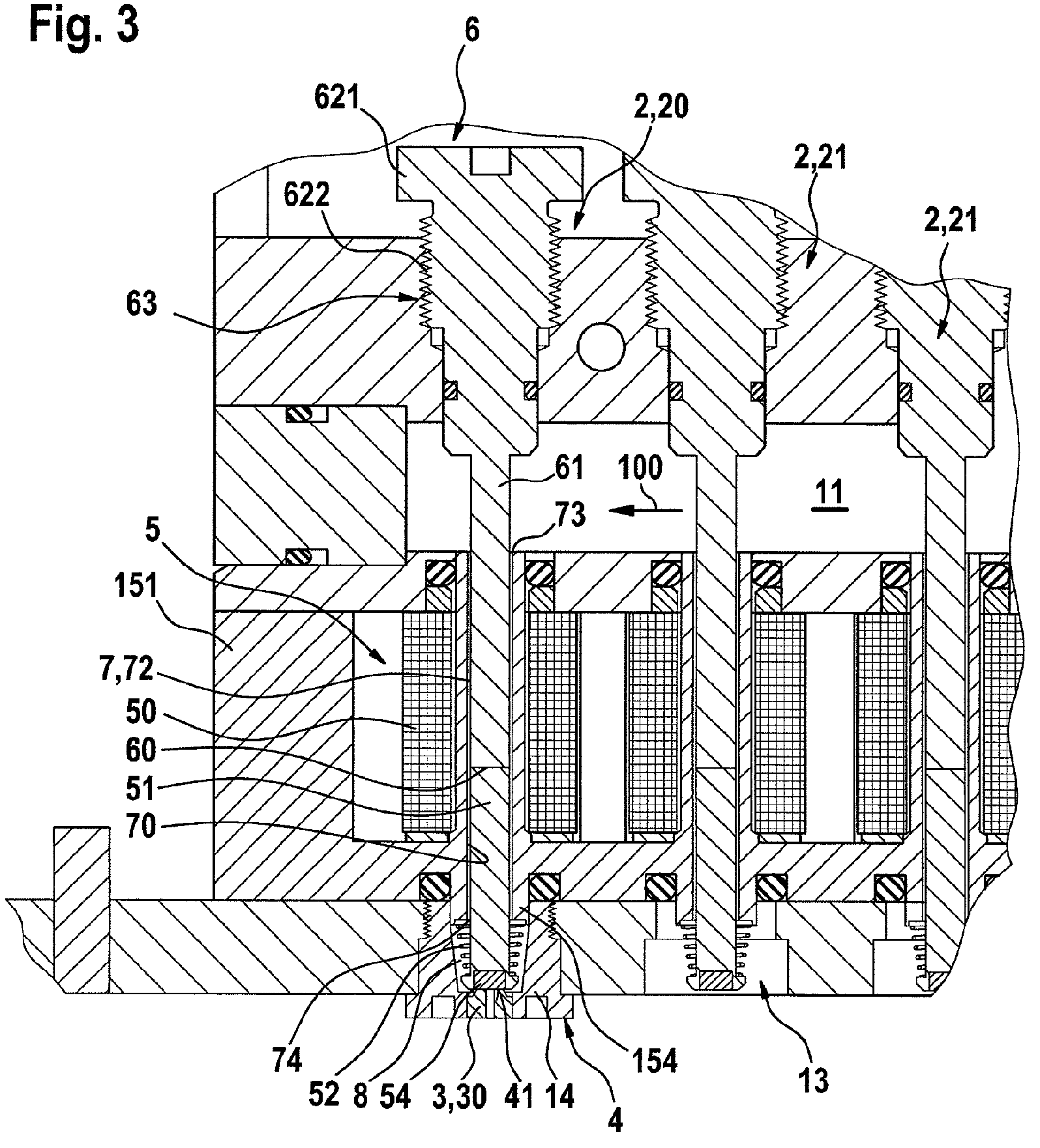

FIG. 2 and the detail in FIG. 3 show the design and structure of the application device 1 according to the invention or of the valve devices 2 in a practical example.

In the lower portion 151 are formed recesses of nine valve devices 2 which receive the latter or parts of them in a straight row next to each other. The valve device 20 at one end of the row is a cleaning valve device which is equipped with the cleaning valve nozzle 30. The other eight valve devices 21 are application valve devices of which the valve nozzles 31 emit application fluid which is under pressure during regular operation.

In the upper portion 152 of the valve body 15 is formed a distributing fluid chamber 11 which can be supplied with pressurised fluid from one side by the connecting opening 16 via a fluid intake duct 110. The chamber is in the shape of an elongate duct having a substantially circular cross-section, which extends along the row of valve devices 2. The distributing fluid chamber 11 is provided with openings 73 at equal intervals on its side facing towards the valve actuating devices 5. This involves in each case the opening 73 of a through-bore 70 or through-hole in the lower portion 151. The through-bore 70 opens out in a projection 154 which engages in a mounting opening 13 of the nozzle plate 121.

The lower portion 151, the nozzle plate 121 which closes the latter at the bottom, the upper portion 152 and the cap 153 which closes the latter at the top are appropriately joined together with screw connections not shown in more detail. The advantage obtained with the invention is that these parts remain in the mounted state when the application device 1 is cleaned.

The valve devices 2, namely the cleaning valve device 20 and the application valve devices 21, are basically designed the same and matching. However, an essential difference lies in that the cleaning valve device 20 at the end of the row is equipped with the cleaning valve nozzle 30 which has a substantially larger flow cross-section than the flow cross-section of the application valve nozzle 31 of each application valve device 21. In the practical example, the application valve nozzles 31 have the same flow cross-section. In the practical example, the flow cross-section of the cleaning valve nozzle 30 is to be ten times larger than the flow cross-section of the application valve nozzle 31.

The valve device 2 which is therefore provided nine times is described below.

The valve device 2 comprises the valve actuating device 5 arranged in the valve body 15, a valve housing 4 with the valve nozzle 3 and a valve seat 41, a valve piston 51, and an adjusting device 6 with an adjusting piston 61 against which the valve piston 51 operates. The valve housing 4 with the valve nozzle 3 forms a screw-in nozzle orifice. The valve housing together with the valve nozzle is detachably mounted on the nozzle side of the valve device comprising the valve nozzle.

The valve actuating device 5 is designed as an electromagnetic device with a magnet coil 50 which surrounds the through-bore 70. From the through-bore 70, on the projection 154 the valve piston 51 protrudes downwards into a piston chamber formed by an inner chamber 8 of the valve housing 4. The valve piston 51 forms the electromagnet armature of the magnet coil 50 and enters the magnet coil 50 in the through-bore 70. The valve piston 51 is mounted centrally in the through-bore 70. Appropriately multipoint mounting, not shown, is provided according to the invention. This is appropriately formed by three knobs offset by 120° each on the longitudinal circumference of the valve piston 51. Thus between the longitudinal circumferential surface of the valve piston 51 and the bore wall of the through-bore 70 is formed an annular gap. The through-bore 70 and the valve piston 51 appropriately have a circular cross-section.

The rear side of the valve piston 51 which lies in the magnet coil 50 abuts against a congruent piston stop 60 of the adjusting piston 61. The adjusting piston 61 enters the magnet coil 50 in the through-bore 70 from the side of the distributing fluid chamber 11. In the process, the adjusting piston 61 extends approximately two-thirds in the magnet coil 50, while the valve piston 51 enters the remaining one-third. The through-bore 70 and through-hole form a common piston chamber in which the two pistons are held. The adjusting device 6 comprises a screw connection 63 which is formed on the wall of the distributing fluid chamber 11 that lies opposite the wall with the fluid intake openings 73.

The adjusting piston 61 has the same cross-section as the valve piston 51, the two pistons being aligned. The adjusting piston 61 is centred in the through-bore 70 by the screw mounting of the screw connection 63. Thus likewise an annular gap is formed between the longitudinal circumference of the adjusting piston 61 and the wall of the through-bore 70. The two annular gaps in the through-bore 70 along the adjusting piston 61 and along the valve piston 51 form a valve fluid duct 7 in the form of a ring-chamber duct 72. The latter extends from the fluid intake opening 73 to the outlet opening 74 at the projection 154. The ring-chamber duct 72 forms, along the two pistons 51, 61 and the through-bore 70, a rectilinear flow path which remains free from corners and edges forming flow shadows. In this respect, it is also important according to the invention that the adjusting piston 61 and the valve piston 51 come into contact with closed surfaces. Between the contact faces in the practical example there is only a stroke distance of approximately 0.5 μm. In every case the stroke distance with the closed end faces of the two pistons 51, 61 is kept so small that the flow through the ring-chamber duct 72 remains smooth and undisturbed in a straight path.

The adjusting piston 61 extends far into the distributing fluid chamber 11 at the fluid intake opening 73 of the ring-chamber duct 72. The cross-section of the adjusting piston 61 is kept relatively small in the flow cross-section of the distributing fluid chamber 11, in order to obtain a large effective flow cross-section towards the fluid intake openings 73 in the distributing fluid chamber 11.

According to the invention, amongst other things the design of the valve housing 4 is particularly important. It is designed in the form of a nozzle orifice which is a closure member 14 easy to attach and remove. The valve housing 4 is formed as a swivel part with an external thread and screwed in a releasable screw connection into the associated internally threaded mounting opening 13 in the nozzle plate 121. The valve housing 4 ends on the outside with an edge orifice abutting against the nozzle/application side 12. The valve nozzle 3 is embedded centrally in the valve housing 4. It is advantageously made of ceramic and can be inserted firmly in the valve housing 4 by pressing it in.

The inner chamber 8 of the valve housing 4, which corresponds to the projection 154, is frustoconical in order to receive the projection 154 precisely and centrally. Furthermore, the inner chamber 8 of the valve housing 4 is designed to receive a pretensioned conical spring 52 which forms part of the valve actuating device 5, pressing a head closure element 54 of the valve piston 51 for closing the valve nozzle 3 against the latter. The valve nozzle 3 on the side of the valve piston 51 is recessed with the valve seat 41 which is engaged by the valve piston 51 with the head closure element 54. In the process, the conical spring 52 which is seated on the valve piston 51 is held or clamped in its pretensioned state between an annular edge of the projection 154 and an annular edge at the head end of the valve piston 51.

As will not be described in more detail here and can be seen from the drawings, the components of the application device 1 are sealed off from each other at contacting form-locking surfaces in the region of fluid-conducting chambers and ducts in the usual manner with seals, e.g. O-rings.

In particular with reference to FIGS. 2 and 3, functions and features of the devices according to the invention are illustrated. In FIGS. 2 and 3, to clarify the drawings only the cleaning valve nozzle 30 is inserted in the nozzle plate 121 by means of the valve housing closure member 14 which can be attached and removed. Naturally, to close all the valve devices 2 the other valve housings 4 are likewise mounted on the nozzle plate 121 so that they can be attached and removed individually.

The cleaning valve nozzle 30 has a relatively large flow cross-section. When the cleaning valve nozzle 30 is open, the fluid passes from the fluid intake duct 110 at a high flow rate along the path 100 in the distributing fluid chamber 11 through the ring-chamber duct 72 of the cleaning valve device 20 to the cleaning valve nozzle 30. Along the flow path 100, which passes all the valve devices 2, contaminants such as particles or deposits are removed particularly effectively from the distributing fluid chamber 11. This involves tiny particles for which the rectilinear ring-chamber duct 72 is not an obstacle. On account of the large nozzle opening of the cleaning valve nozzle 30, a high flow that entrains very fine contaminants is produced. The flow cross-section of the cleaning valve nozzle 30 is so large that this nozzle is not suitable for application and is not used for this. The stroke of the adjusting device 6 of the cleaning valve device is set so long that the flow cross-section of the valve nozzle 30 comes into its own.

The cleaning valve device 20 is closed by switching off the valve actuating device 5. The application valve devices 21 are successively opened by activation of the associated valve actuating devices 5. That is to say, in succession there is always only one of the application valve nozzles 31 open, while the other application valve nozzles 31 are kept closed. The distributing fluid chamber 11 is supplied with pressurised cleaning fluid. In this way, effective cleaning and flushing of the ring-chamber duct 72 as well as of the inner chamber 8 of the valve housing 4 which receives the conical spring 52 and includes the application valve nozzle 30 is achieved in each application valve nozzle 31.

The sequence of applications of cleaning fluid under pressure as well as opening and closing the valve devices 2 is advantageously performed by an electronic control device. The latter is designed with a control program such that the sequence of method steps is predetermined and can be carried out. The usual electronic control means of a computer and/or a logic circuit for application control can be used as the electronic control device. An electronic control device of this kind is not shown in the drawings. It is wired to the electrical contacts 91 of the electronic power device 9 for example using a logic circuit board.

It is a great advantage that cleaning and flushing take place in a state of the application device in which the adjusting devices 6 of the application device 1 remain mounted. On the side of the application device 1 opposite the nozzle plate 121, there is therefore no handling by dismounting.

To eliminate major contamination in the valve devices, the valve housing closure members 14 of the application valve devices 21 are successively unscrewed downwardly or refitted from below, in order to clean one application valve device 21 each. Each application valve device 21 is therefore opened by removing the valve housing 4 with valve nozzle 31 and by exposing the mounting opening 13.

Removal of the valve housing 4 designed as the closure member 14 is particularly simple. After the valve housing 4 has been removed, the mounting opening 13 exposes the valve piston 51 and the conical spring 52, parts which, as such, can easily be removed downwards through the mounting opening 13. Then flushing takes place under high pressure, for example with water or a special cleaning agent. The valve piston 51, the conical spring 52 and the valve housing 4 with its valve nozzle 3 are cleaned individually. Furthermore, to complete cleaning, the valve housing 4 of the cleaning valve device 20 can also be removed and, while the application valve devices are then closed, flushed with water. Again it is of particular importance that the adjusting devices 6 remain mounted. Handling is necessary only on the lower side of the application device 1.

With the adjusting device 6, a desired fine stroke between closed position and open position of the valve piston 51 can be adjusted in a simple manner. For this purpose the adjusting device 6 has a micrometric fine thread 622 with adjusting screw 621.

Figure 4:
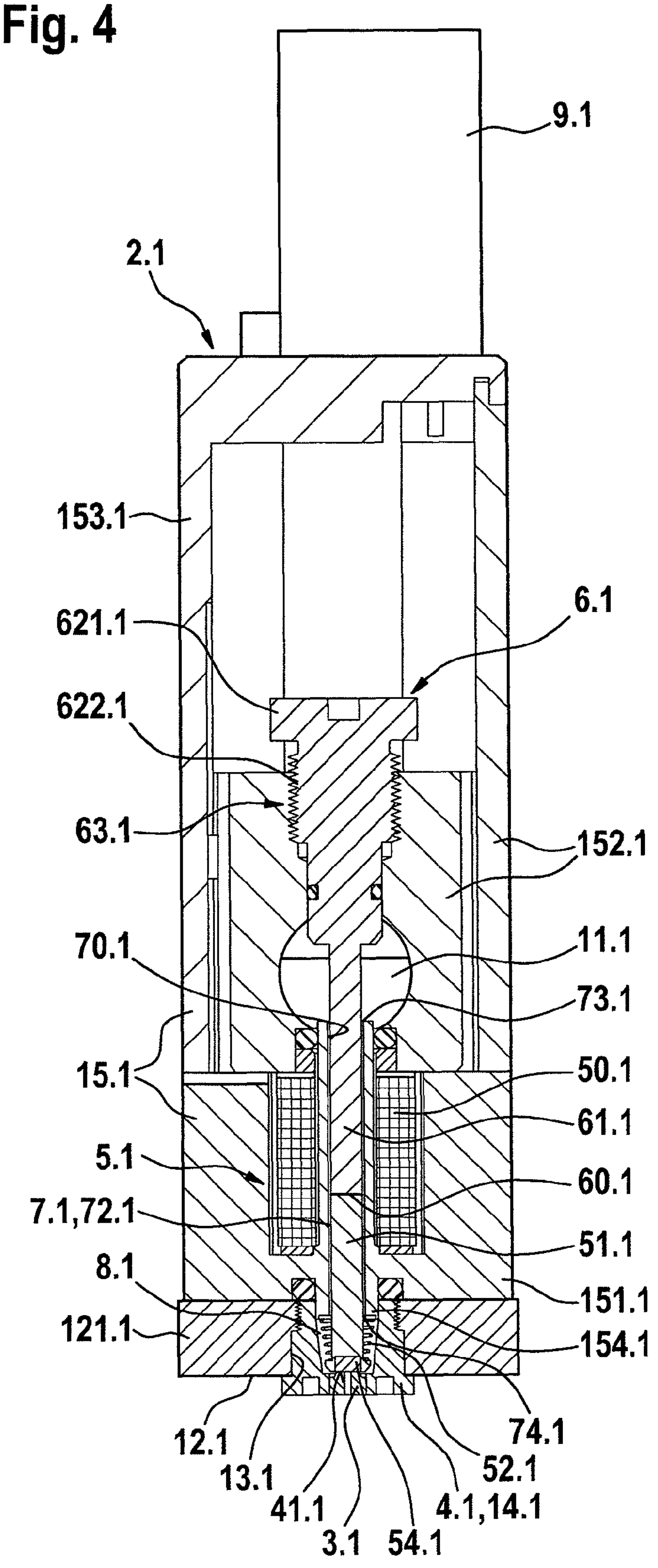

An application device 1 as described in the practical example of FIGS. 1 to 3 can also appropriately be provided as a module unit which can be assembled with identical module units into an application device with nozzles arranged in rows and columns In the embodiment described, the valve devices 2 are accommodated and formed in parts 151 to 153 of the common valve body 15. Naturally, the valve devices can also each be formed by a single valve device. Such a valve device is shown in the embodiment in FIG. 4. The single valve device has the same parts or corresponding parts as the valve device 2 of the application device 1 described. In FIG. 4 this is indicated by the fact that the reference numbers used in FIGS. 1 to 3 are used with the number 1 after the dot.

A single valve device 2.1 according to FIG. 4 can be assembled in a plurality into an application device according to the invention. It is then necessary, as not shown in FIG. 4, to connect supply fluid chambers 11.1 in series by suitable sealing means, not shown. Joining single valve devices together in this way is known in the art.

The valve device 2.1 according to FIG. 4 has the features, functions and advantages described for the valve device 2 of the application device 1 described above in the practical example. The valve device 2.1 has independent inventive importance even without use in an application device according to the invention. It must be emphasised that the arrangement of the adjusting device 6.1, the ring-chamber duct 72.1 which forms the rectilinear longitudinal flow path, and the nozzle orifice which is formed by the valve housing 4.1 and can be removed downwards, in combination has advantages.

In particular the straight flow path of the ring-chamber duct 72.1 can be cleaned easily and effectively with the nozzle orifice which is easy to remove and fit. The nozzle orifice can be exchanged and mounted quickly with the desired valve nozzle 3.1. Only handling on the lower side of the valve device 2.1 takes place. On the upper/rear side of the valve device 2.1, all parts remain mounted. The adjustment setting can be carried out easily and precisely in spite of the exchangeable nozzle orifice. The straight flow path of the ring-chamber duct 72.1 has the advantage of avoiding flow shadows in which particles are otherwise caught, in the region of which deposits arise and/or which impair the throughflow for example as a result of trapped air. Due to the longitudinal flow, the inner region of the magnet coil 50.1 is cooled very effectively.

The invention claimed is:

1. Valve device of an application device for applying fluid to a substrate, comprising a valve body, a valve housing with associated nozzle for emission of the fluid under pressure and having an inner chamber which can admit fluid and a valve seat, a supply fluid chamber which can be subjected to fluid pressure, a fluid connection between supply fluid chamber and valve housing inner chamber, a valve actuating device which is formed by an electromagnetic device with valve piston movable back and forth against a return force and engaging in the valve seat for opening and closing the valve nozzle, and a piston stop which forms an adjusting piston and against which the valve piston operates and which is mounted so as to be displaceable in the direction of the stroke for setting and adjusting the piston stroke, the valve actuating device being arranged between the supply fluid chamber and the valve housing, and the valve nozzle being detachably mounted on the nozzle side of the valve device which comprises it, characterized in that the valve device has a nozzle plate which closes the valve body at the bottom on the nozzle side, with mounting opening for the valve piston, in that the valve housing is designed in the form of a nozzle orifice which is a closure member that can be fitted on the mounting opening of the nozzle plate from below and removed, the valve nozzle forming part of the valve housing, and the valve piston engaging in the valve seat for opening and closing the valve nozzle when the closure member is fitted, while the valve piston is exposed through the mounting opening of the nozzle plate for removal and fitting when the closure member is removed, in that the valve device is provided with at least one rectilinear fluid duct that remains free from flow corners and that, passing the valve actuating device, connects the supply fluid chamber to the valve seat of the valve housing inner chamber, the valve piston and part of the adjusting piston together forming a wall of the straight fluid duct which, when the nozzle orifice closure member is removed, is exposed for cleaning through the mounting opening.

2. Valve device according to claim 1, characterized in that the adjusting piston and the valve piston come into contact with closed surfaces, and between the contact faces there is provided a stroke distance of approximately 0.5 to approximately 50 μm.

3. Valve device according to claim 1, characterized in that the valve piston and the adjusting piston are held in a common piston chamber forming a ring-chamber duct which surrounds the valve piston and part of the adjusting piston and which makes the straight fluid connection between the supply fluid chamber and the valve seat in the valve housing inner chamber.

4. Valve device according to claim 3, characterized in that the valve piston is mounted centrally within the common piston chamber.

5. Valve device according to claim 3, characterized in that the valve body has a projection in which the common piston chamber opens out and which engages in the mounting opening of the nozzle plate.

6. Valve device according to claim 5, characterized in that the inner chamber of the valve housing is shaped frustoconically, corresponding to the projection.

7. Valve device according to claim 5, characterized in that a spring of the valve actuating device is seated on the valve piston and in the pretensioned state is held between an annular edge of the projection and an annular edge at the head end of the valve piston.

8. Valve device according to claim 1, characterized in that the valve housing is screwed in a releasable screw connection into the mounting opening in the nozzle plate.

9. Valve device according to claim 1, characterized in that the valve nozzle is formed with the valve seat on the side of the valve piston.

10. Valve device according to claim 1, characterized in that the inner chamber of the valve housing receives a pretensioned spring which forms part of the valve actuating device and which, when the closure member is removed, is exposed through the mounting opening for removal and fitting.

11. Valve device according to claim 1, characterized in that the adjusting piston extends at least substantially two-thirds in a magnet coil of the valve actuating device, while the valve piston engages in the remaining one-third.

12. Application device for applying fluid to a substrate, comprising valve devices which are arranged in a row and are each equipped with an application valve nozzle for emitting the fluid under pressure and with associated valve actuating device for controlling the emission of fluid by opening and closing the application valve nozzles, comprising a common distributing fluid chamber which can be subjected to pressure from the fluid and which connects the application valve devices to each other for admission of the fluid, the distributing fluid chamber being provided with a fluid intake duct which is arranged in such a way that the fluid which is under pressure in the distributing fluid chamber is distributed along the row of application valve devices to the latter, characterized in that the valve devices are each formed by a valve device according to claim 1.

13. Application device according to claim 12, characterized in that it is formed by a module element which is assembled with identical module elements into an application device with nozzles arranged in rows and columns.

* * * * *